May 10, 1955  F. W. BORDEN  2,707,955
BLOOD-LOSS METER
Filed July 17, 1953  7 Sheets-Sheet 3

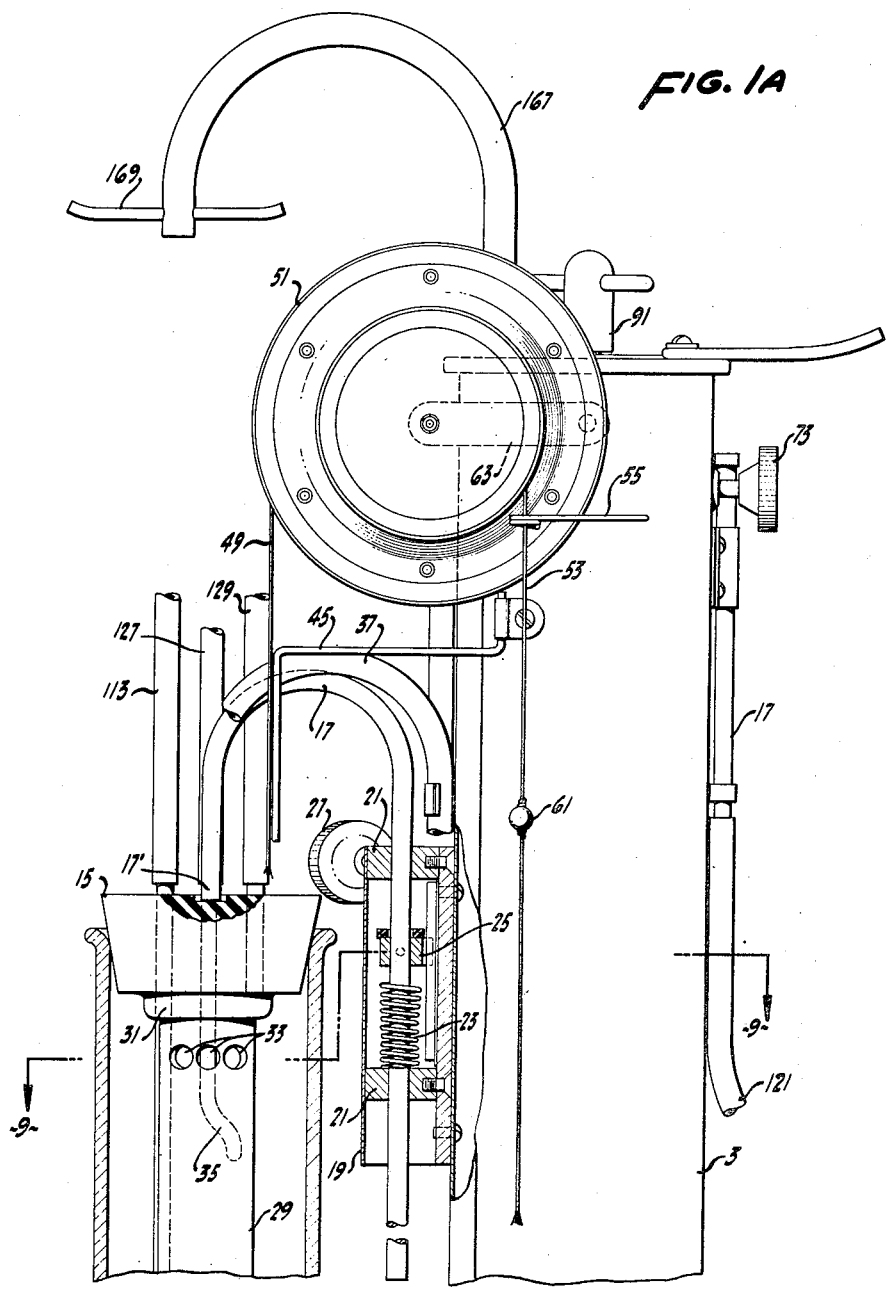

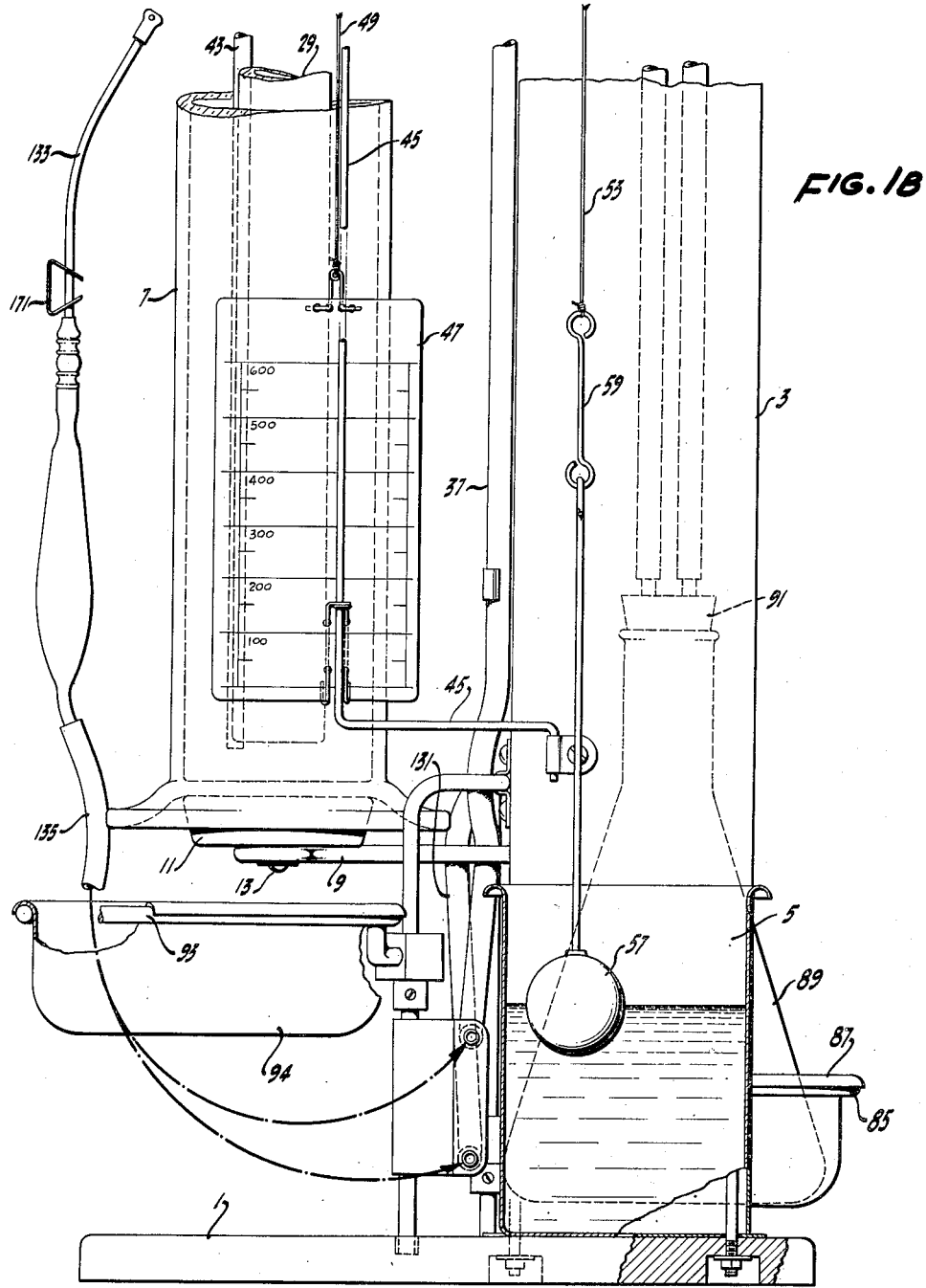

INVENTOR.
FREDERIC W. BORDEN
BY
ATTORNEYS

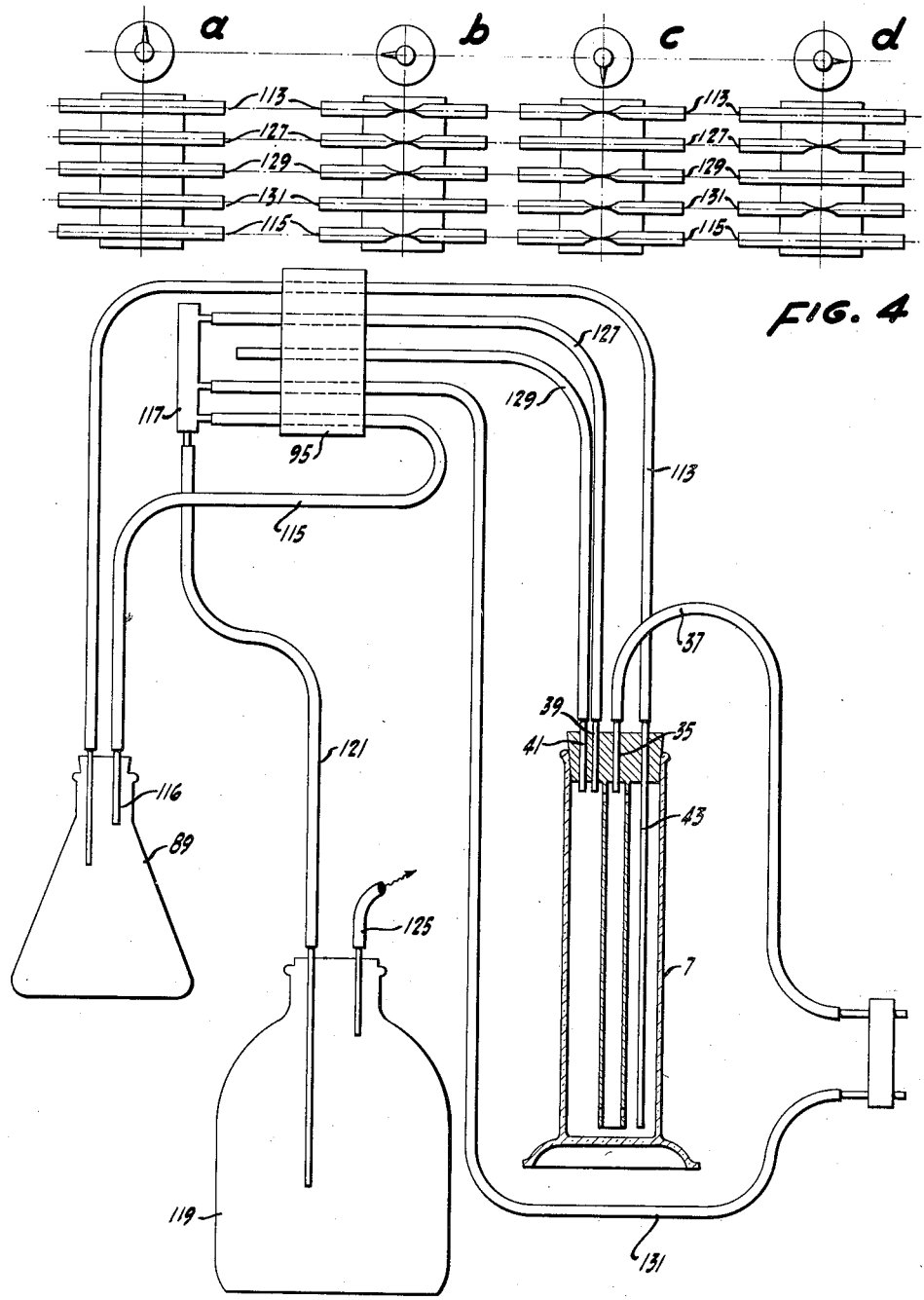

May 10, 1955  F. W. BORDEN  2,707,955
BLOOD-LOSS METER
Filed July 17, 1953  7 Sheets-Sheet 5

INVENTOR.
FREDERIC W. BORDEN
BY Lippincott & Smith
ATTORNEYS

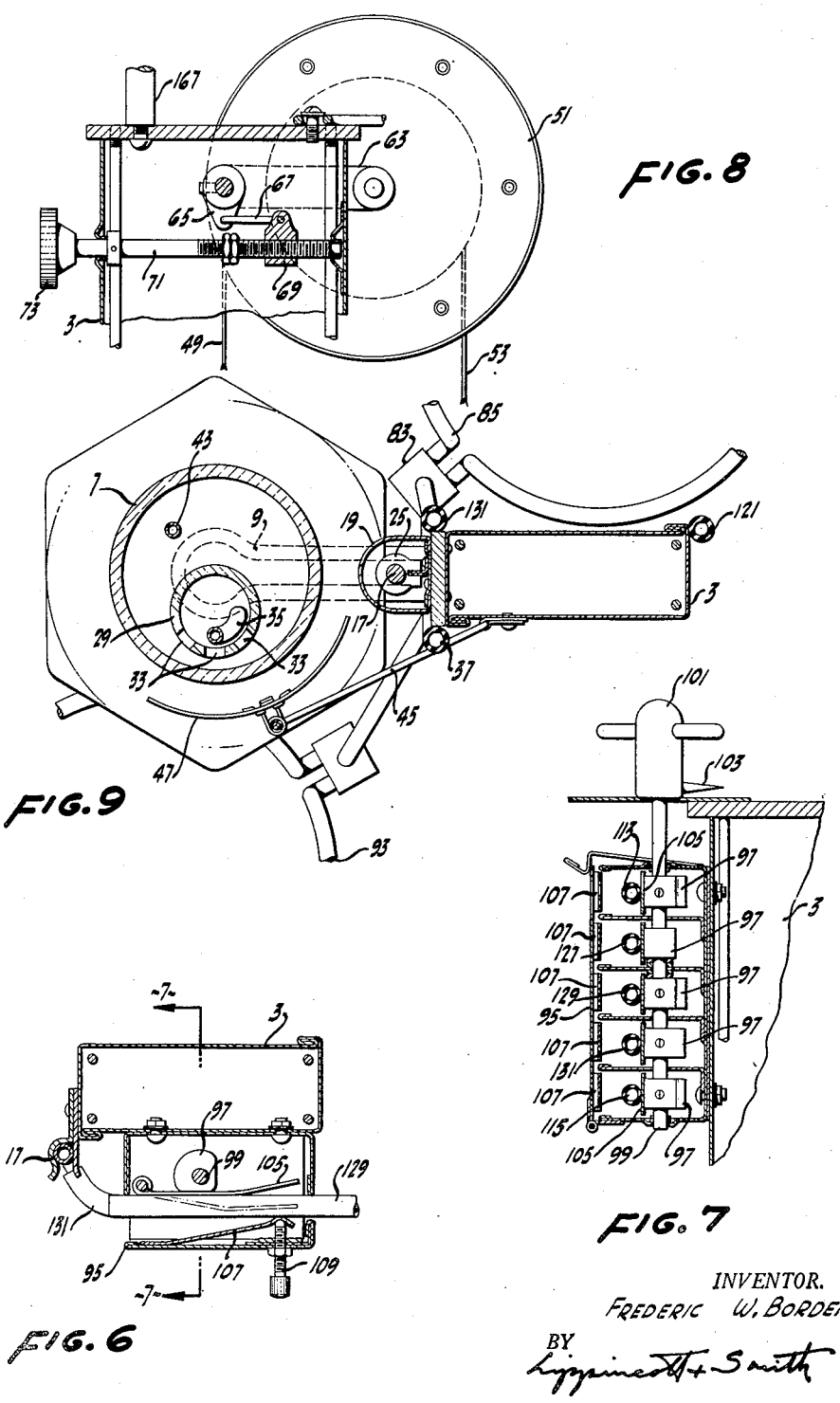

May 10, 1955  F. W. BORDEN  2,707,955
BLOOD-LOSS METER
Filed July 17, 1953 7 Sheets-Sheet 7
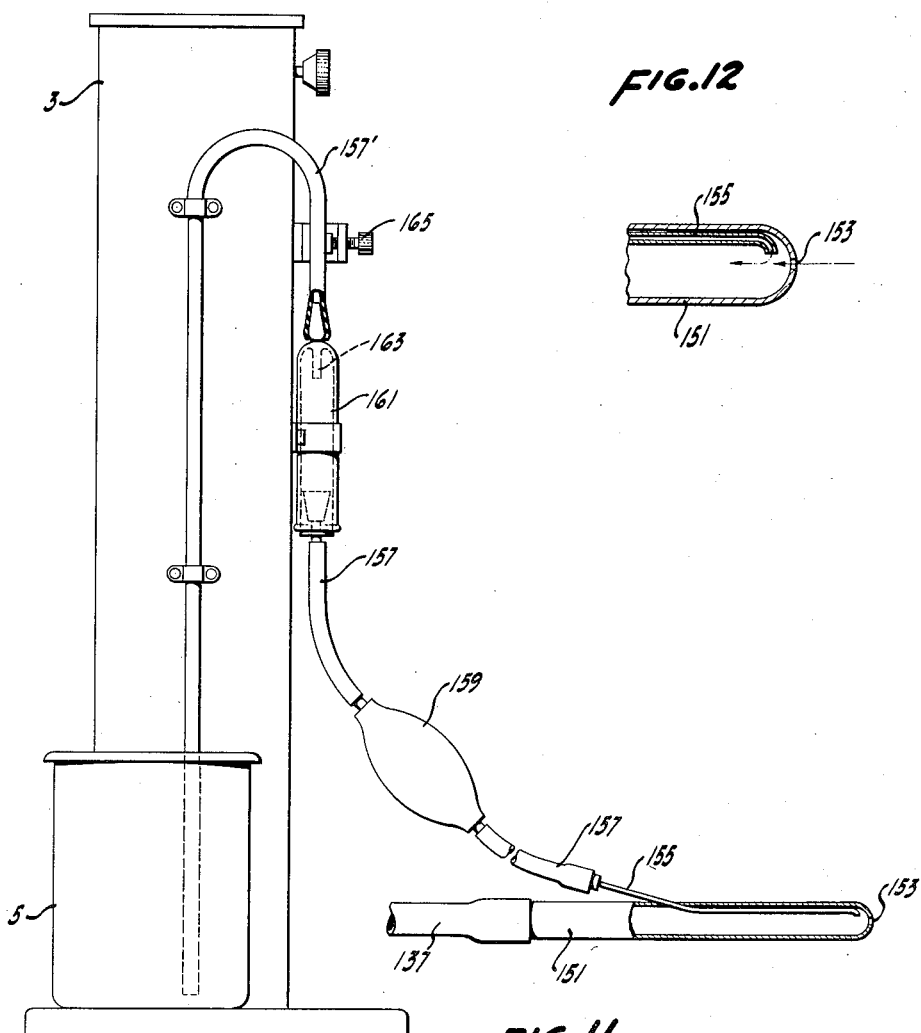
INVENTOR.
FREDERIC W. BORDEN
BY
Lippincott & Smith
ATTORNEYS

United States Patent Office 2,707,955
Patented May 10, 1955

2,707,955

BLOOD-LOSS METER

Frederic W. Borden, San Jose, Calif.

Application July 17, 1953, Serial No. 368,773

13 Claims. (Cl. 128—278)

This invention relates to apparatus for measuring the loss of blood in surgical operations.

Any operation, even those ordinarily termed "minor," can result in a large total effusion of blood. This is true even of operations which are not ordinarily accompanied by large blood loss but in the course of which occasional instances of unexpected and complicating factors result in excessive bleeding. It is, therefore, important that blood loss should be estimated routinely in the progress of all surgical procedures, both "minor" and major, so that immediate action may be taken to combat shock before serious or irreversible changes develop in the patient's body. Remedial action should be considered when approximately 10% of the patient's blood volume has been lost. The loss of 15% of the blood volume makes replacement almost essential and replacement is mandatory at a 20% loss.

Loss of blood during surgery has always been of concern to the surgeon. In the early days of modern surgery transfusion was resorted to only for serious shock. In recent years, blood for transfusion has become more readily available, the factors inducing surgical shock and the treatment of shock are better understood and carried out, and transfusion during progress of the surgical procedure has become routine for types of operations which, by their nature, necessarily involve large losses of blood.

In operations of this type, it is quite usual for the surgeon to have available, preoperatively, from three to six or more pints of blood for transfusion during the operation. The need is clearly recognized for a method of accurately estimating the volume of blood loss promptly enough for the surgeon to maintain volumes of loss and replacement approximately equal. By so doing, he can avoid insidious development of shock from too little replacement of blood or the equally serious insidious development of heart failure or lung edema ("drowning") resulting from too much replacement.

Blood loss has been calculated on selected groups of surgical cases and under research conditions for the purpose of obtaining average losses for various types of operations. Lists of average blood loss are published in the literature, but such "average" losses are obviously not a reliable guide for blood replacement in any individual case.

Despite the recognized need, measurement of surgical blood loss has not become an accepted or "necessary" part of surgical care in each individual case in the same sense that blood counts before and after surgery have been accepted. It is common knowledge that blood counts during and after surgery are without value in guiding the surgeon even approximately in replacing blood loss. The above mentioned research cases have shown that surgeon's unguided estimate of the volume lost is almost invariably grossly inaccurate. The reason that such measurement or at least an accurate estimation of the blood loss has not become routine, as in the cases of the other precautions mentioned, is doubtless the fact that no satisfactory method of measurement has heretofore been available.

Measurement of such loss can be made only with some difficulty. The surgical field is ordinarily kept as clear as possible of blood by two expedients, first, surgical gauze sponges are used to absorb the effused blood and second, that which cannot be absorbed in this manner is aspirated through a suction tip. Sponges can be weighed before and after use and the absorbed blood can be closely estimated by the difference in weight. Handling the aspirated blood is not so simple. Blood is somewhat viscous even when fresh; it starts to clot immediately upon escaping from the blood vessels and upon contact with the air, and when aspirated, it is mixed with large quantities of air. Clotting may occur, therefore, either before aspiration or within the suction tip or its conduits. In order to keep the suction tip clear, it is therefore necessary to use rinsing water or a diluent solution more or less continuously throughout the operation. The customary method of doing this is to dip the suction tip frequently into a reservoir of sterile diluent. Simple dilution will, of course, prevent clotting and clogging of the tips if such dilution occurs early enough in clotting process and often enough. With conventional methods it is not always possible to do this, and sometimes the operation has to be halted while a suction tip is cleared or a new one is substituted.

The problem is further complicated by the fact that it is frequently necessary to aspirate other fluids during the preoperative stage, before cutting procedure is started. In tonsillectomies, it is almost always necessary to remove vomitus or saliva, or both. In this, and other, operations there may be pus to be removed, and in abdominal operations, there may be ascitic fluid. Not only are these fluids often not sterile and hence to be kept clear from the surgical field after the cutting starts, but their inclusion in the fluid measured could also lead to a false estimate of the amount of blood loss. The suction tip used for removing these fluids also requires rinsing or dilution. All told, there is an undetermined and undeterminable amount of fluid passed through a suction apparatus which is not blood and the presence of this fluid complicates the desired measurement. It is usually not feasible to employ two complete and separate sources of rinse water or other diluent and two separate installations of suction apparatus. Furthermore, time is of utmost importance in an operative procedure. A change-over from the suction tip used in pre-operative preparation to the suction tip which must necessarily be used after surgical cutting has started, or a reserve change in case liquids other than blood are encountered in the course of the operation would take valuable time and would involve possibilities of procedural error where such error might literally be fatal.

The broad purpose of the present invention is to provide a blood measuring apparatus which permits accurate measurement of blood loss and avoids the difficulties above mentioned. More specifically, among the objects of the present invention are to provide an apparatus which automatically records surgical blood loss volume progressively throughout the total duration of the surgical procedure; to provide immediate and continuous guidance of the application of measures used in combatting the ill effects of bleeding; to provide a quantitative basis for effectively matching the volume of blood loss by the simultaneous and continuous administration of an equal volume of transfused blood or other liquid, thus providing a reliable guide for avoiding the hazards of both under-replacement and over-replacement of lost blood; to provide ready information of the approximate percentage of the patient's total blood volume lost; to provide an apparatus which is not limited to either the amount of rinse water or other diluent used or the amount of blood lost by the patient; to provide means for automatically eliminating clot formation within the suction tip, tubings, and collecting reservoir or reservoirs; to provide means for pre-operative clearing of the surgical field of fluids other than blood, and, with a single adjustment and without danger of confusion, of bypassing the fluids thus collected, including rinse water or other diluents, past the measuring equipment, thus avoiding not only false measurements, but also avoiding contamination of the operating suction tip; to provide a means of introducing a diluent, with or without anti-foaming, anti-clotting or other additives, automatically and continuously rather than manually and intermittently in the aspirating procedure; and to provide a means of introducing the diluent in a manner such that it does not come in contact with the tissues in the surgical field and hence the diluent may (if desired) be toxic without causing harm to the patient.

Considered broadly the apparatus of this invention comprises a pair of straight-sided reservoirs, such as cylinders, the cross-sectional areas of which bear a known ratio. One of these, the dispensing reservoir, is for holding a supply of rinse water or other diluent. The second is a metering reservoir and is closed to the atmosphere except for various inlet and outlet conduits connecting therewith.

Connections are provided for withdrawing from the dispensing reservoir all rinse water to be used during an operation, and further connections between a suction tip and the metering reservoir to cause both rinse water and blood to be drawn into the latter. A float, resting on the rinse water, connects with a movable scale reading against the liquid level in the metering reservoir, the interconnection being such as to maintain the zero of the movable scale at the liquid level in the metering reservoir as long as the liquid therein consists wholly of rinse water withdrawn from the dispensing reservoir. Where bleeding occurs, however, the blood is withdrawn from the operating field mixed with the rinse water, and entering the metering reservoir, raises the level of the liquid therein above the zero of the movable scale. The latter is calibrated to read directly the excess in volume which represents the loss of blood.

Means are preferably also provided for cumulatively metering liquid withdrawn from the metering reservoir when the volume of liquid used exceeds the capacity of the latter, for supplying a constant, controlled amount of rinse water and concurrently aspirating it from the field of operation and for adding anti-coagulant to the water. These and other details can best be explained in the description of a preferred form of the invention which follows, taken in connection with the accompanying drawing, wherein:

Fig. 1A is a side elevation of the upper half and Fig. 1B is a similar side elevation of the lower half of the embodiment of the invention described;

Fig. 3 is a diagrammatic view of the metering reservoir, conduit and valve system;

Fig. 4 is a diagrammatic illustration of the various valve settings;

Fig. 6 is a fragmentary cross-sectional view through the valve mechanism, the plane of section being indicated by the line 6—6 of Fig. 5;

Fig. 7 is a fragmentary sectional view through the valve mechanism, the plane of section being indicated by the lines 7—7 in Fig. 6;

Fig. 8 is a fragmentary view, partly in section and partly in elevation, illustrating the differential suspension of the float and scale, together with the means for making the zero adjustment, the plane of section being indicated by the line 8—8 of Fig. 2;

Fig. 9 is a partial cross-sectional view, transversely through the apparatus, illustrating the glass inlet and baffle tubes within the metering cylinder, the curved scale and its vertical guide rod outside the cylinder together with other structures to be described later, the section being taken on a composite plane as illustrated by the lines 9—9 of Fig. 1A.

Fig. 11 is a diagrammatic illustration showing partly in section, and not to scale, the suction tip and the equipment for supplying a regulated quantity of diluent continuously thereto; and Fig. 12 is a detailed view, shown on a larger scale, of the construction of the end of the suction tip.

Figure 2:
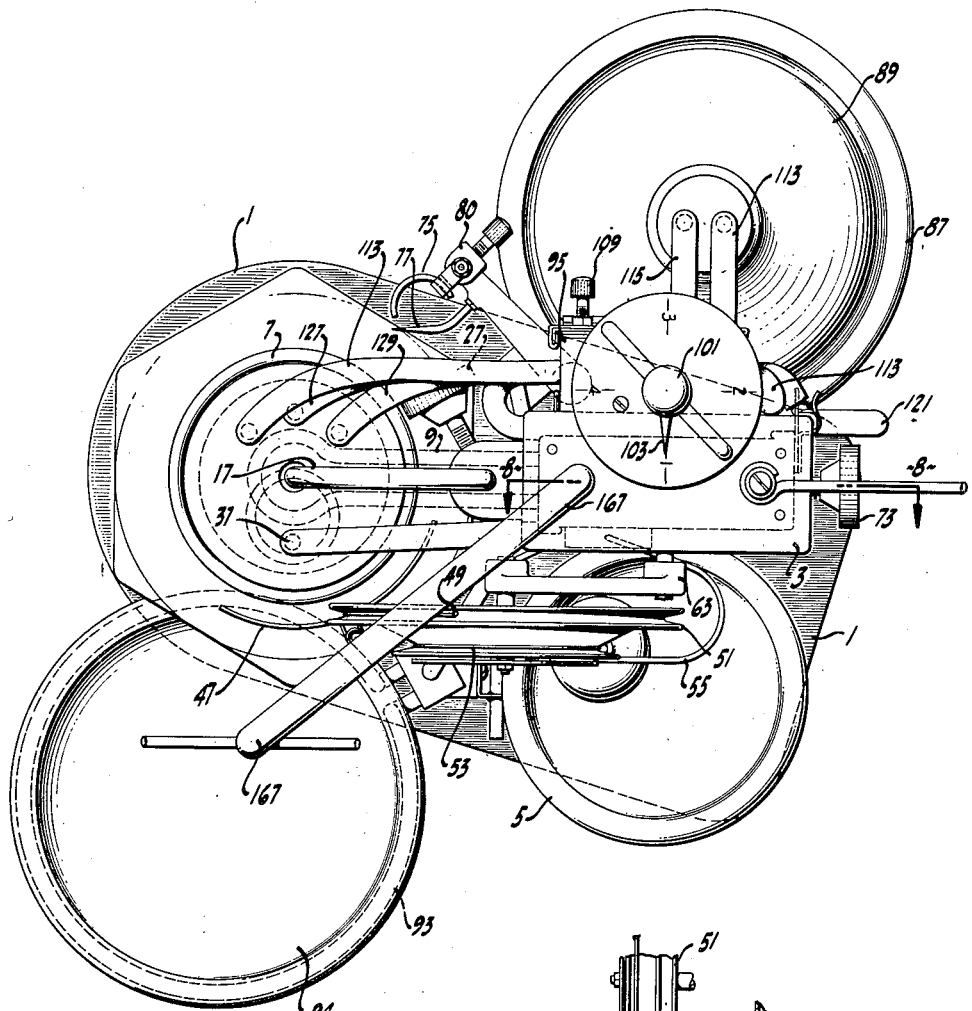
Fig. 2 is a plan view of the apparatus shown in Figs. 1A and 1B.
Figure 10:
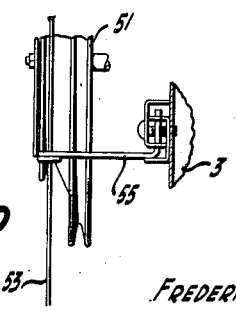
Fig. 10 is a fragmentary section of the rim of the differential pulley.

The essential elements of the form or embodiment of the invention chosen for detailed description are best shown in Figs. 1A and 1B, which taken together, constitute a side elevation of the apparatus. The working elements are supported on a base 1, from which rises a column 3 which supports most of the equipment. It will be realized that the apparatus must be capable of disassembly for cleaning and sterilization, and therefore, substantially all of the elements are removable. A cylindrical dispensing reservoir 5, preferably made of metal, such as stainless steel, or other material which can be properly sterilized, rests directly on the base closely adjacent to the column 3, it being contemplated, however, that the reservoir may be raised substantially higher than the base. The column may be also made of stainless steel or other sheet material where lightness is desired and for convenience of attaching the various other elements of the apparatus. Among the elements so supported is a metering reservoir 7, comprising a cylindrical container, preferably of glass so that the liquid level within it may be observed, it being noted, however, that it could also be made of metal or even of plastic, providing that even a portion of its wall were transparent. It is to be noted that both of the reservoirs are straight-sided, so that their cross-sectional area is constant throughout their depth and therefore the volume of liquid held by each of them is directly proportional to the height to which it rises. Conveniently both vessels are of a type which is obtainable generally from surgical supply houses, e. g., a hydrometer jar and a Bain Marie Pot respectively. They are obtainable in various sizes and their absolute dimensions are therefore not important to the invention. It is important, however, that the ratio of their cross-sectional areas be a known constant throughout their depth.

The metering reservoir 7 rests upon looped bracket 9, extending outwardly from the column. This bracket supports a disc 11, preferably of rubber or like resilient material, held securely and secured to the bracket by a screw and washer 13. The upper end of the reservoir 7 (shown in Fig. 1A) is closed by a stopper 15 of rubber or like material and the reservoir is clamped in position between the pad 11 and the stopper 15 by a goose-neck clamp rod 17. A bearing bracket 19, riveted or otherwise secured to the column 3 on the side facing the metering reservoir encloses bearings 21 in which the clamp rod slides. A spring 23 surrounds the rod and bears against a collar 25 which is secured to it, tending to force it upward and its end away from the stopper 15. As the rod can turn as well as slide within its bearings, its end can be swung clear of the stopper for disassembly; when the apparatus is in use the rod is pressed down, the end 17' against the stopper, as shown, and the rod is then clamped in position by means of a thumb screw 27.

Depending from the stopper within the metering reservoir is a cylindrical baffle 29, held in place within a flange 31 molded on the lower face of the stopper. Both ends of the baffle are open into the reservoir, the upper end through apertures 33, the lower end by reason of the fact that it does not extend quite to the bottom of the reservoir, although it is convenient, as a matter of practice, to provide apertures in both ends so that in assembling the device after cleaning, it makes no difference which end is held by the stopper.

Four nipples open into the metering reservoir through the stopper. The first of these is an inlet nipple 35, taking, in this case, the form of a glass tube extending downward within the baffle 29 adjacent to one wall thereof, with its end bent laterally so as to impart a swirling motion of the liquid down the side of the baffle. This tends to prevent splashing and splattering of the liquid and limit such spattering as does occur to the interior of the baffle so that the liquid level within the reservoir is not obscured. The nipple connects the suction tip through a rubber conduit 37, shown only fragmentarily in Fig. 1A but completed in the conduit and valving diagram of Fig. 3. A second connection through the stopper of the metering reservoir is simply a short straight nipple of metal or glass tubing 39. A third nipple 41, is similar. A fourth, 43, extends substantially to the bottom of the reservoir. The various connections to these will be described below.

A guide rod 45, also supported from the column 3, extends vertically parallel to the metering reservoir. A transparent scale 47 is mounted to slide on the guide rod. The scale is preferably curved so as to conform approximately to the outer contour of the metering reservoir, and it is graduated to read in terms of the volume of liquid in the latter above the zero of the scale. Customarily graduation will be in cubic centimeters or millimeters.

The scale is suspended from a ligament 49 which passes up and around one circumference of a pulley 51. A second ligament 53 likewise passes around a second circumference of the pulley and is secured thereto, the second ligament being wrapped in the opposite direction. The ligament 53 passes through a guide loop 55 and supports a float 57, designed to ride upon the liquid in the dispensing reservoir. The float hooks to a link 59 which is, in turn, secured to the ligament. A stop bead 61 prevents the ligament from slipping through the guide 55 and off the pulley when the float is unhooked for sterilizing purposes. The diameters of the two parts of the pulley 51 are in inverse proportion to the effective cross-sectional areas of the metering and dispensing reservoirs respectively (due account being taken of the displacement of baffle 29), so that when the float falls due to the withdrawal of liquid from the dispensing reservoir the scale 47 will rise by a proportional amount. Hence if liquid is merely transferred from one reservoir to the other, without the addition of blood, the zero index of the scale 47 having been first set to the height of any initial liquid in the metering reservoir, the zero datum will still remain at the liquid level. Any additional liquid from a source other than the dispensing reservoir will, however, be indicated upon the scale which will read the differential amount of liquid supplied. If the effective cross-sectional areas of the two reservoirs were equal it would not be necessary to use a pulley of two diameters, but it is advisable that the ligament or ligaments be secured to the pulley rim to prevent slippage.

Means are provided for making such a zero adjustment. The pulley 51 is journalled upon an arm 63, which turns in bearings in the top of the column 3. As is shown best in Fig. 8, the arm 63 forms one arm of a bell crank, the other arm 65 of which is within the column. Arm 65 connects with a link 67 which attaches to a nut 69 running on an adjusting screw 71. A knob 73 on this screw permits the raising and lowering of the differential pulley 51, whereby the zero reading of the scale may be set.

Preferably there is a second scale apposed to the metering reservoir. This is a scale 75, also graduated to read volume above a zero datum in the same units as the scale 47. The scale 75 is for the purpose of making metering withdrawals from the metering reservoir as will later be described. This scale works adjustably in relation to an index 77 which is incorporated as a fixed part of the bracket 80. The scale itself is mounted by two brackets 78 on a guide rod 79 which is slidably adjustable through a sleeve in the bracket 80. The bracket itself is slidably adjustable on a larger guide rod 81 mounted on the main column. In making withdrawals from the metering reservoir, a graduation on the scale representing the amount which is desired to be withdrawn is set co-incident with the movable index 77 and the index is then set level with the liquid surface within the reservoir. The liquid can then be withdrawn down to the zero datum on the scale. Should more or less liquid be withdrawn than was desired, the scale may be readjusted through the sleeve in the bracket to set the zero datum at the new liquid level and the actual volume of withdrawn liquid can then be read on the scale against the index 77. These refinements are valuable in keeping track of the blood loss in long operations where the loss is high. The scale is practically a necessity, but the adjustable features in the index are largely matters of convenience although it must be realized that anything which minimizes the probabilities of error becomes important in a situation as serious as a surgical operation.

Preferably also the base supports means for measured storage of the liquid withdrawn. This comprises a bracket 83 from which extends a metal loop 85 within which there fits a pan or basin 87. An Erlenmeyer flask 89 is one of the most readily obtainable and accurate receptacles for the metered storage purpose, since it is inherently stable, particularly when supported by the basin 87. Closed with a rubber stopper or similar closure 91, it is provided with inlet and outlet openings provided with nipples for connecting rubber conduits as will hereinafter be described more in detail. It is convenient also to provide a second bracket 93 holding another basin 94 for use during the pre-operative procedure as will be described below.

The tubular conduits which connect the various elements are preferably of gum rubber, which can be removed and sterilized and which can be valved by compressing the tubing itself without the necessity for internal valve mechanisms of a mechanical nature which would be difficult to cleanse. The various conduits are controlled by a ganged valve mechanism mounted at the top of the column and indicated generally by reference character 95 and illustrated in detail in Figs. 6 and 7. The valve includes five cams 97 mounted on a common shaft 99 which may be turned by a control knob 101. There are four operating positions for the valve and these are preferably indicated by an index or a pointer 103 which indicates four different valve conditions, represented, in the present index by the numerals 0, 1, 2, and 3, and termed respectively in the description below the "off position," "position one," "position two," and "position three." The cams are of generally circular contour with flattened quadrants for relieving the pressure on the tubing. They are identical, with two adjacent quadrants flattened, except for the second from the top, which has opposite quadrants flattened. The mechanism is indicated best in the plan view of Fig. 6. Each cam presses against a spring leaf 105 to compress the rubber tubing, which is passed through the valve structure between this spring leaf and a second leaf 107, whose position can be accurately adjusted by a screw 109. It will be seen that when the flat side of the cam is apposed to the spring 105 the lumen of the rubber tube is open, whereas a circular face apposed to the spring squeezes the tubing and closes the valve.

Figure 5:
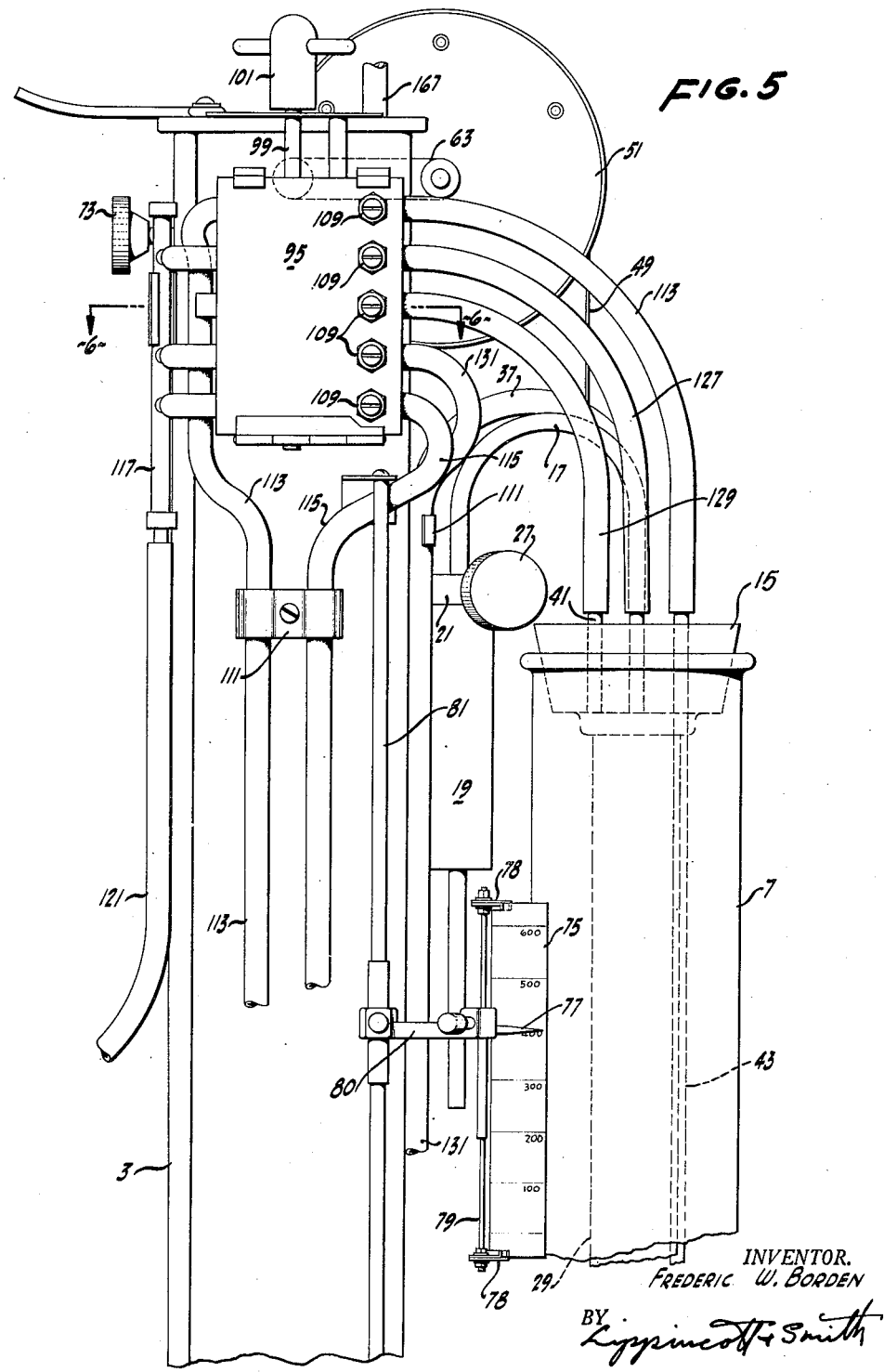
Fig. 5 is a rear elevation of the upper portion of the apparatus of Figs. 1A and 1B, showing, particularly, the valve and conduit system.

A schematic layout of the conduit system as a whole is shown in Fig. 3. The tubing from the operating suction tip has already been identified as the conduit 37, leading into the metering reservoir 7. In addition to this conduit there are various others, which are clipped to the column by spring retainers 111, best shown in Fig. 5, from which they can be removed for sterilization. The additional conduits include a tube 113 which connects from the liquid exhaust nipple 43 which extends down to the bottom of the metering reservoir. This tube leads through the upper valve section into the metered storage flask 89. The outlet connection from the flask 89 connects back through a tube 115, passing through the lowest valve section to an exhaust manifold 117 and thence into a large waste liquid reservoir 119 through a discharge tube 121. It is to be noted that the nipple 116 preferably has a small leak hole (not shown) provided through its wall to relieve residual vacuum within the flask when conduits 113 and 115 are closed by the valve mechanism as described below. A final conduit 131 feeds from a suction tip, through the fourth valve section from the top, into the manifold 117.

The operation of the valve in the various positions is indicated by the four diagrams of Fig. 4. In the zero or "off" position of the valve, all sections are open. This is the standby position, and since the conduit 129 is open to the air no vacuum is available on the operating suction tip. This position is not employed when the device is in actual operation, the purpose being primarily to leave the tubing unstressed during periods of non-use and also to permit easy rethreading of the tubes after the device has been disassembled and cleaned. This situation is indicated at *a* of Fig. 4. The positions utilized during actual operation are indicated at *b*, *c*, and *d* of Fig. 4.

The purpose of these various positions will best be understood by a description of the mechanical operation of the apparatus which will be described upon completion of description of the mechanical details, it being sufficient to note at this point that closed valves are indicated by constrictions in the diagrams illustrating the various conduits, while open valve sections are indicated by the unconstricted conduits.

Although a standard type of suction tip may be used in this apparatus, and rinsed intermittently by dipping it into the dispensing reservoir, it is greatly preferable to complete the system by providing automatic continuous rinsing and dilution apparatus such as is shown in Figs. 11 and 12. The suction tip as used in this case comprises a glass or (preferably) metal tube 151, having a rounded tip with an aspirating aperture or apertures 153 either directly in the end thereof or in the sides close to the end. In practice tube 151 is usually about one-quarter inch internal diameter and of thin wall section so that the tube or conduit 137, of like internal diameter, can be slipped over the open end thereof as shown in the drawing. A much smaller tube 155 is brought in through the side of the tube 151. The tube 155 preferably has an internal diameter of the order of $\frac{1}{32}$ inch. It extends longitudinally within the tube 151 to a point closely adjacent to the orifice 153, where the end is bent so that the tube 155 discharges transversely across the orifice, as shown most clearly in Fig. 12. A small rubber tube 157 fits over the projecting end of tube 155 and connects, preferably through a rubber aspirating bulb 159, with a metering glass 161 of a type which is familiar from its use in giving blood transfusions. The metering glass is cylindrical, having a connecting nipple at the lower end for the tube 157 and a discharge nozzle 163 entering at the top and connecting with the continuation 157' of the tube 157. The gauge glass is suspended by the tube 157' from a regulating clamp 165, by means of which the lumen within the tube 157' can be compressed to a desired degree. The end of the tube 157' is clipped to the supporting column 3 in the same manner as the other tubes and conduits previously mentioned and extends down to the bottom of the dispensing reservoir 5. It will be seen that suction applied through the tube 37 will also be transmitted through the tube 157, 157', drawing the diluent from the dispensing reservoir into the gauge glass 161, where it is first allowed to collect up to a desired level as indicated on the drawing. The inlet tube to the gauge glass can then be constricted to any desired degree, and the amount of diluent limited and estimated by the rate of drip from the nozzle 163. This provides a small but constant flow of diluent into the suction tip, where it comes in contact with blood immediately upon its entry into the tip. It cannot escape from the tip because of the negative pressure inside; if the diluent be simply water it will prevent by mere dilution a large amount of the clotting and foaming which would otherwise occur, but since the liquid does not come in contact with the outside of the suction tip it can also contain anti-clotting, anti-foaming or digesting agents even should these agents be toxic. The digesting agents can be used to hydrolize and disintegrate clots which may already have formed outside of the tip before being aspirated.

Although it is not necessarily a part of the invention it is convenient that the apparatus be provided with a handle 167 extending upward from the column. This may be crooked, as shown, and provided with a crossbar 169 from which the suction heads or tips may be suspended when not in use by means of a clip 171.

The utilization of the device will best be understood by a description of the actual procedure of operating the apparatus. Prior to initiation of such procedure the dispensing reservoir 5, the "preoperative" suction tip 133 and its conduit 135, the self rinsing "operative" suction tip 151 together with its suction conduit 137 and its smaller diluent supply conduit 157 and attached drip gauge and conduit 157', the float 57, and pan or basin 94 must be sterile. Approximately 500 cc. of rinse solution or diluent is placed in the basin or pan 94 for preoperative purposes, and a measured amount such as 1000 cc. of the sterile rinse solution is placed in the dispensing reservoir 5. The float 57 is hooked to the ligament 53 through the link 59 where it rests upon the surface of the liquid in the dispensing reservoir. The preoperative suction tip and tubing are attached to the tubing 131, and the control valve 95 is set to position 1 from position 0. The exhaust connection 125 is attached to the usual suction pump, aspirator, or other exhaust apparatus.

As will be seen from the schematic diagram of Fig. 4*b* this position of the general control valve 95 constricts all of the tubings 113, 127, 129, and 115, leaving only the tubing 131 open, and this bypasses the metering equipment and leads directly into the general waste reservoir 119.

Before active preoperative procedure starts, however, it is best to set the meter. The valve is set to position 2, which closes all of the ducts except 127, and thus applies suction through the conduits 37 and 137 to the operative suction tip 151. With the valve in this position the tip is preferably dipped into the basin 94, drawing liquid therefrom into the metering cylinder wherein it is allowed to collect to a depth of approximately one inch. The valve is then turned to position 3, which opens conduit 113, connecting the bottom of the metering cylinder into the storage flask 89, and conduit 115 out of the flask into the exhaust manifold and thus the waste liquid jar 119 and the exhaust system. It also opens conduit 129, permitting the entry of air to the upper end of the metering reservoir and so permits some of the liquid therein to flow into the metered storage flask 89. A small amount or perhaps half of the liquid that has been introduced into the metering reservoir is therefore transferred into the flask 89. The dispensing reservoir will now be nearly full of sterile solution and the scale 47 near the bottom of its travel with its zero index somewhere near the level of the liquid at the bottom of the metering reservoir. The adjusting screw 73 is then turned to raise or lower pulley 51 as necessary to bring the zero datum of the scale into exact correspondence with the datum of the liquid in the metering reservoir. This calibrates the device.

The control valve 95 is now turned back to position 1, opening conduit 131 and the preoperative suction tip 133 used in the ordinary fashion for pre-operative clearing of the surgical field. Liquid remaining in the basin 94 may be used for rinsing the pre-operative suction tip. When the pre-operative procedure is completed the pre-operative tip is hung out of the way, the control valve is restored to position 2, and ordinary operating procedure, suitable for the particular case in hand is followed thereafter, the only difference being that because of constant supply of diluent into the suction tip 151 it is usually unnecessary to remove it periodically from the surgical field for rinsing. Since, however, unexpected emergencies may always arise, in case clogging should occur the rubber aspirating bulb 159 may be used to force a jet of diluent through the tube 155 under positive pressure while occluding the aspirating aperture 153 with the sterile gloved finger instead of relying upon the negative pressure from the exhaust to draw it through. The aspirating bulb is of well known construction, having check valves so arranged that when it is compressed the inlet valve closes preventing back flow of diluent and the outlet valve opens to force the diluent onward. Releasing the bulb causes a reverse operation of the check valve and refills the bulb. This construction being well known it is not shown.

As has been pointed out already, as the float 57 falls due to withdrawal from the dispensing reservoir the scale rises proportional amounts so that if there is no added blood or added liquid the zero index will remain at the liquid level. Hence any rise in the liquid level above the datum will be indicated upon the scale.

Under some circumstances a great deal more diluent or rinse fluid is used than the volume of blood, and the metering reservoir will fill, causing the scale to rise as the operation progresses. At a suitable time before the scale reaches the top of the metering reservoir, a measured amount of liquid is withdrawn from it and a like amount of sterile diluent is replaced in the dispensing reservoir. In order to accomplish this the index on the scale 75, indicative of a convenient amount of liquid to be withdrawn is set to correspond with the index 77. The index 77 is then set to correspond with the liquid level in the metering reservoir. The control valve 95 is then turned to position 3 until enough liquid has been transferred to the measured storage flask 89 to bring the level in the metering cylinder down to the position of the zero index on the scale and an amount of diluent is added to the dispensing cylinder equal to that withdrawn from the metering reservoir, which restores a reading on the scale 47 to the true value of blood loss. The amount of liquid in the metered storage flask 89 serves as a check upon the amount to be added to the dispensing reservoir.

Owing to the fact that as soon as the value has been turned back to position 2, the connections to the measured storage flask are blocked off, the stopper 91 can now be removed and the liquid collected therein can be discarded. For an operation of moderate length this procedure can be that normally followed, since the metering cylinder has a capacity of something over 1000 cc. When the amount of loss exceeds 500 cc. or thereabouts or appears likely to exceed it, the operation can be changed slightly. Some definite amount of liquid, such as 500 cc. or 1000 cc., can be withdrawn from the metering reservoir without the replacement of an equal amount in the dispensing reservoir. Instead of being discarded the liquid thus withdrawn can be transferred to a larger receptacle and retained as a check on the final result. Whenever desired, however, an additional amount of liquid can be removed from the metering reservoir and replacement be made in the dispensing reservoir as before.

It should be clearly apparent that by a very simple change of connections the measured storage flask could be omitted and liquid drawn directly from the metering reservoir into the manifold 117 and thence into the waste flask 119. In a situation as serious as that involved in blood loss, however, the transfer into measured storage and the opportunity it provides for a check of the actual loss where such loss is large and exceeds the initial capacity of the metering cylinder is of very material value.

Ordinarily the transfer to the measured storage flask and the replenishment of the dispensing reservoir are accomplished by a nurse, the surgeon or anesthetist himself being too busy to do this. On such an operation it is highly desirable that more or less continuous transfusion of blood should take place. Such transfusion is ordinarily accomplished by an anesthetist, who, in keeping track of the transfusion, can oversee the nurse's procedures in measuring the blood loss, and this, will again provide a double check. The device is designed, however, to make such double-checking as nearly automatic as possible and to eliminate the possibility of error wherever this can be done.

The invention has been described in terms of a working apparatus including features which, while highly desirable, are not essential to the functioning of the meter per se. The invention is not limited to equipment embodying such features, all intended limitations being expressed in the following claims.

What is claimed is as follows:

1. A blood-loss meter comprising a dispensing reservoir for a diluent and a metering reservoir, each of said reservoirs being of substantially constant cross sectional area throughout its depth, a scale calibrated to read volumes contained in said metering reservoir with varying depth of liquid therein, a float adapted to ride on the surface of liquid within said dispensing reservoir, a suspension balance for supporting said scale in apposition to said metering reservoir and said float within said dispensing reservoir, the ratio of the lever arms of said balance supporting said scale and said float respectively being in inverse proportion to the ratio of the effective cross sectional areas of said metering and dispensing reservoirs, adjustable means for supporting said suspension balance for bringing a zero index on said scale to a datum level with respect to said metering reservoir, a suction tip for aspirating blood from an operating field and liquid from said dispensing reservoir, tubing connecting said suction tip to discharge into said metering reservoir, and connections for a suction pump communicating with said suction tip, whereby transfer of liquid from said dispensing reservoir to said metering reservoir causes no change in the relative position of the liquid level in said metering reservoir with respect to the index on said scale whereas increase in total volume of liquid due to blood therein is directly readable on said scale.

2. A blood-loss meter as defined in claim 1 including means for withdrawing measured volumes of liquid from said metering reservoir.

3. A blood-loss meter as defined in claim 1 including means for supplying diluent from said dispensing reservoir within said suction tip continuously during the use of said tip.

4. A blood-loss meter as defined in claim 1 including a tube extending within said suction tip and opening interiorly thereof and adapted to connect with said dispensing reservoir to supply diluent continuously to blood aspirated thereby.

5. A blood-loss meter comprising a dispensing reservoir and a metering reservoir, each of said reservoirs having substantially straight sides and said metering reservoir having a transparent wall portion for observation of the level of liquid therein, a float adapted for suspension within said dispensing reservoir to respond to changes in level of diluent therein, a scale movably mounted adjacent to the transparent wall portion of said metering reservoir and calibrated in terms of the volume of liquid therein above a zero index on said scale, a suction tip for aspirating blood from an operating field and diluent from said dispensing reservoir, a tube connecting said suction tip to discharge into said metering reservoir, and a differential movement including means for suspending said float within said dispensing reservoir and said scale in apposition to said metering reservoir and so proportioned that transfer of liquid from dispensing to said metering reservoir will raise the zero index of said scale by an amount substantially equal to the rise in liquid level in said metering reservoir due to such transfer.

6. A blood-loss meter as defined in claim 5 including means for changing the vertical position of said differential movement to set the zero index of said scale to a desired datum.

7. A blood-loss meter comprising a base and a supporting column mounted thereon, a metering cylinder having a transparent wall portion supported by said base, a dispensing cylinder also supported on said base, a volumetric scale movably mounted in apposition to said metering cylinder, a float adapted to ride on liquid in said dispensing cylinder; means on said column for suspending said scale and said float comprising a pulley and ligaments secured thereto connected to said scale and float and encircling said pulley from opposite directions, the diameters of the portions of said pulley encircled by the ligaments connected to said float and said scale being respectively in the ratio of the effective cross-sectional area of said metering cylinder to said dispensing cylinder; a substantially airtight closure for said metering cylinder, and means opening into said metering cylinder for connecting thereto a suction tip and an exhaust system.

8. A blood-loss meter as defined in claim 7 including baffle means within said metering cylinder for preventing blood discharged from said suction tip connecting means from spattering onto said transparent wall portion.

9. A blood-loss meter as defined in claim 7 including a suction tip and a conduit for connecting said suction tip to said metering cylinder, and means connecting with said suction tip for admitting thereto liquid from said dispensing cylinder.

10. A blood-loss meter as defined in claim 9 including means in said connecting means for regulating the amount of liquid admitted to said suction tip and means for measuring the amount so admitted.

11. A blood-loss meter as defined in claim 7 including a second volumetric scale mounted in apposition to said metering cylinder and adjustable with relation thereto for measuring withdrawals of liquid therefrom.

12. Apparatus for measuring loss of blood during a surgical operation comprising a dispensing reservoir and a metering reservoir, means for connecting a suction tip for aspirating blood from a surgical field and diluent liquid from said dispensing reservoir to said metering reservoir, a vertically movable scale mounted in apposition to said metering reservoir and variable in position in response to variations in level of liquid in said dispensing reservoir and entering said metering reservoir, and a connection into said metering reservoir for attachment to a suction system.

13. Apparatus as defined in claim 12 including means for adjusting the position of said scale independently of the level of liquid in said dispensing reservoir.

No references cited.